Figure 1:
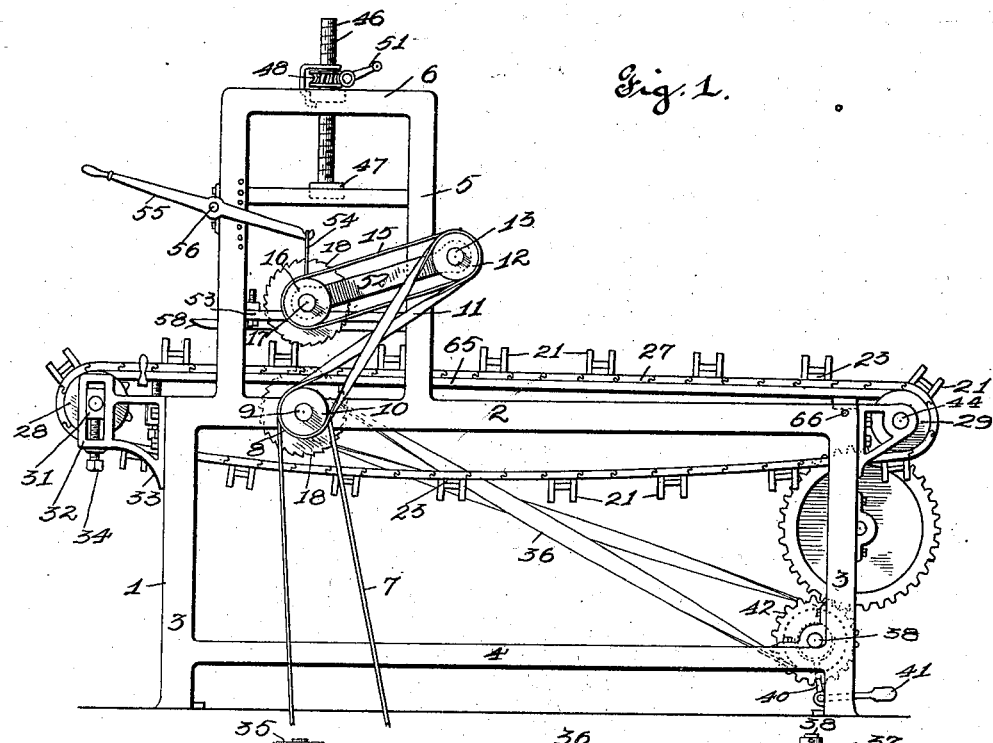

No. 726,673. PATENTED APR. 28, 1903.
W. GOETHE.
SAWING MACHINE.
APPLICATION FILED AUG. 29, 1902.
NO MODEL. 5 SHEETS—SHEET 1.

Witnesses
Alfred A. Eicks
M. S. Orion

Inventor
Walter Goethe
by Higdon & Longan attys.

No. 726,673. PATENTED APR. 28, 1903.
W. GOETHE.
SAWING MACHINE.
APPLICATION FILED AUG. 29, 1902.
NO MODEL. 5 SHEETS—SHEET 2.

No. 726,673. PATENTED APR. 28, 1903.
W. GOETHE.
SAWING MACHINE.
APPLICATION FILED AUG. 29, 1902.
NO MODEL. 5 SHEETS—SHEET 3.
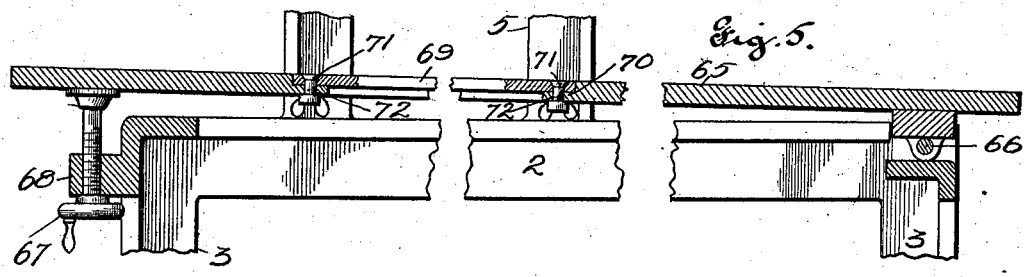
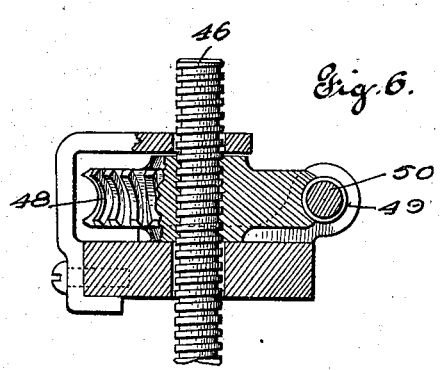
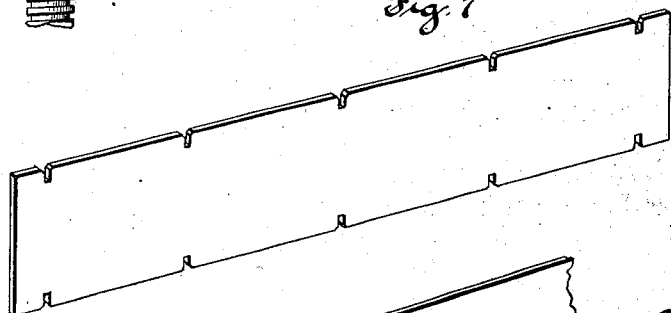
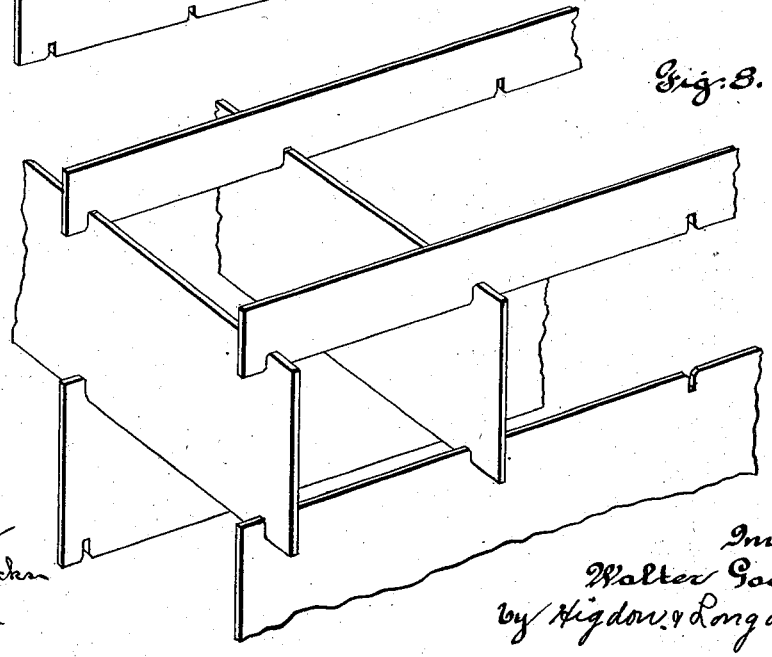
Witnesses
Alfred W Eicks
M. E. Irion
Inventor
Walter Goethe
by Higdon & Longan Attys No. 726,673.  
PATENTED APR. 28, 1903.  
W. GOETHE.  
SAWING MACHINE.  
APPLICATION FILED AUG. 29, 1902.  
NO MODEL.  
5 SHEETS—SHEET 4.

Witnesses  
Alfred W Eicks  
M S Irwin

Inventor  
Walter Goethe  
by Higdon & Longan attys.

No. 726,673. PATENTED APR. 28, 1903.
W. GOETHE.
SAWING MACHINE.
APPLICATION FILED AUG. 29, 1902.
NO MODEL. 5 SHEETS—SHEET 5.
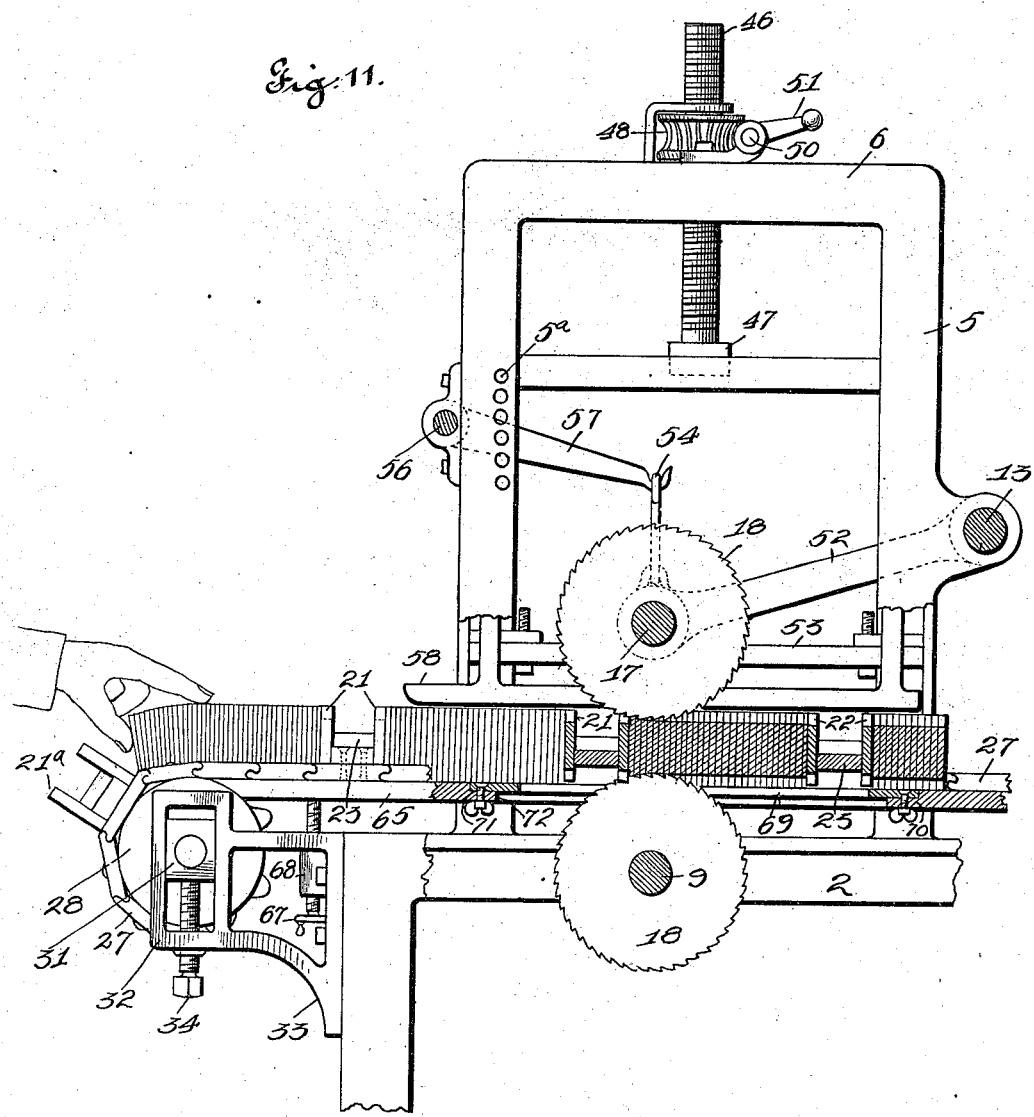

UNITED STATES PATENT OFFICE.

WALTER GOETHE, OF ST. LOUIS, MISSOURI.

SAWING-MACHINE.

SPECIFICATION forming part of Letters Patent No. 726,673, dated April 28, 1903.

Application filed August 29, 1902. Serial No. 121,504. (No model.)

*To all whom it may concern:*

Be it known that I, WALTER GOETHE, of the city of St. Louis, State of Missouri, have invented certain new and useful Improvements in Sawing-Machines, of which the following is a full, clear, and exact description, reference being had to the accompanying drawings, forming a part hereof.

My invention relates to improvements in sawing-machines, and has for its object to provide a saw adapted to cut the necessary slits or grooves involved in the production of the forms of "packing-boxes for bottles" patented to John C. Schoenthaler in the two several Letters Patent numbered 276,289, issued April 24, 1883, and 305,533, issued October 14, 1884.

While my invention has been designed by me for the specific purpose named, it will be apparent to any one skilled in the art of woodworking machinery that it may be utilized to equal advantage in many other forms of woodworking.

My invention has for its essential object, however, the production of slotted, grooved, and notched strips or other sections of wood such as are described in the Letters Patent above referred to and displayed in the drawings accompanying the said Letters Patent.

My invention consists in the construction and combination of parts, which will be hereinafter specifically described and which will be more readily understood by reference to the accompanying drawings, in which—

Figure 2:
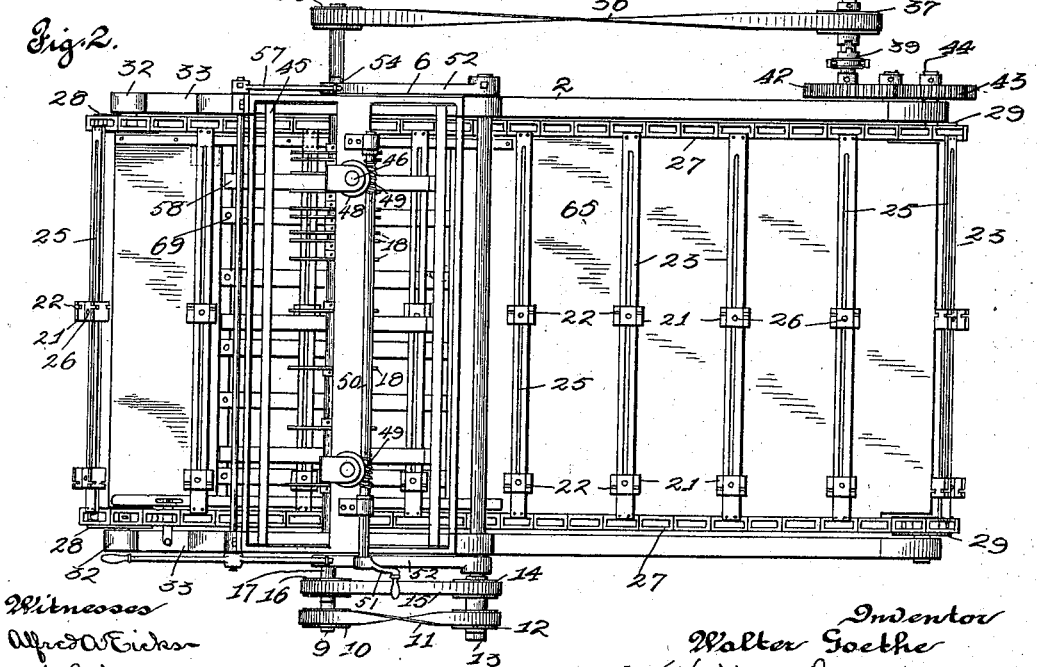
Figure 3:
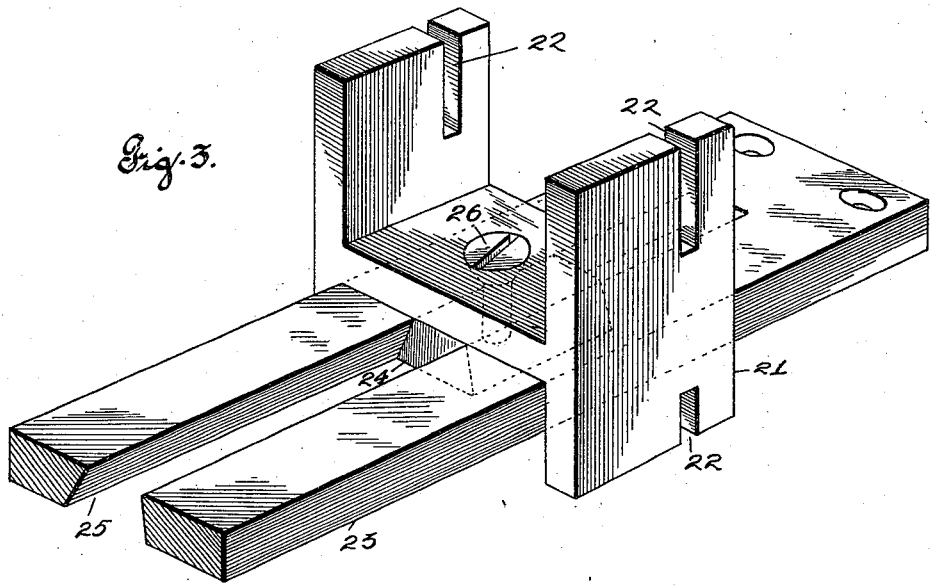
Figure 4:
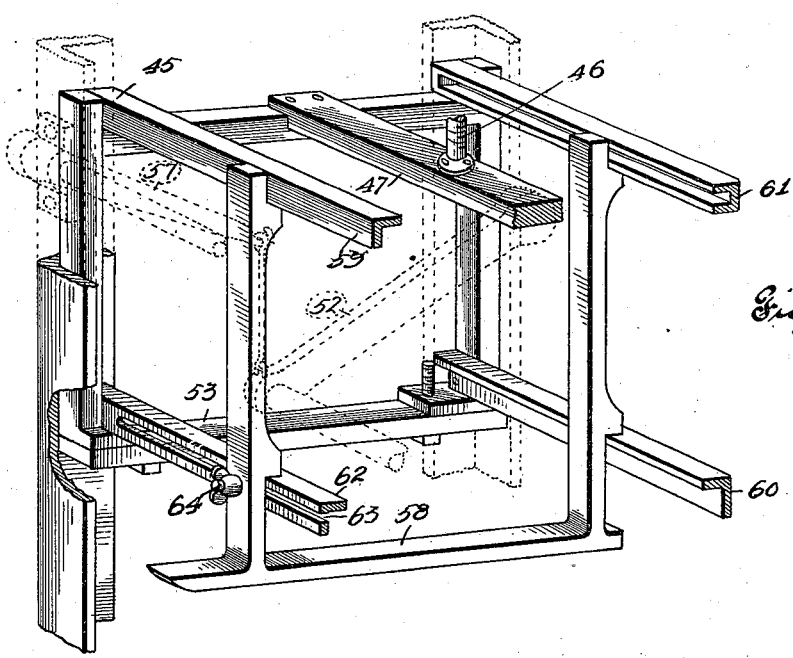
Figure 9:
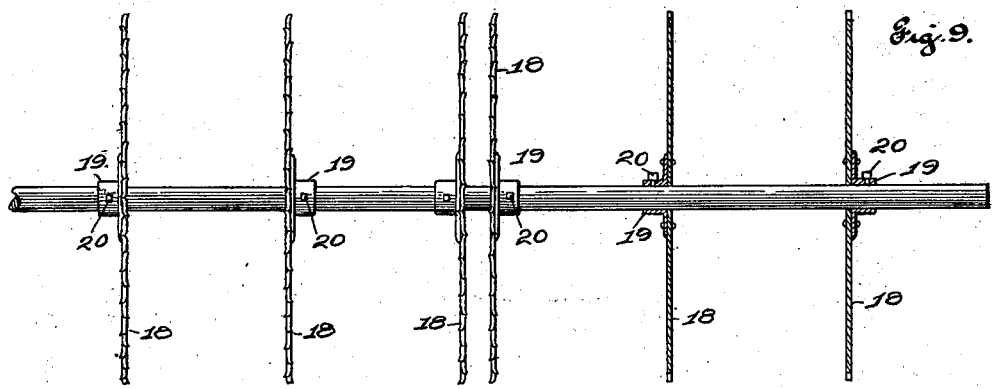
Figure 10:
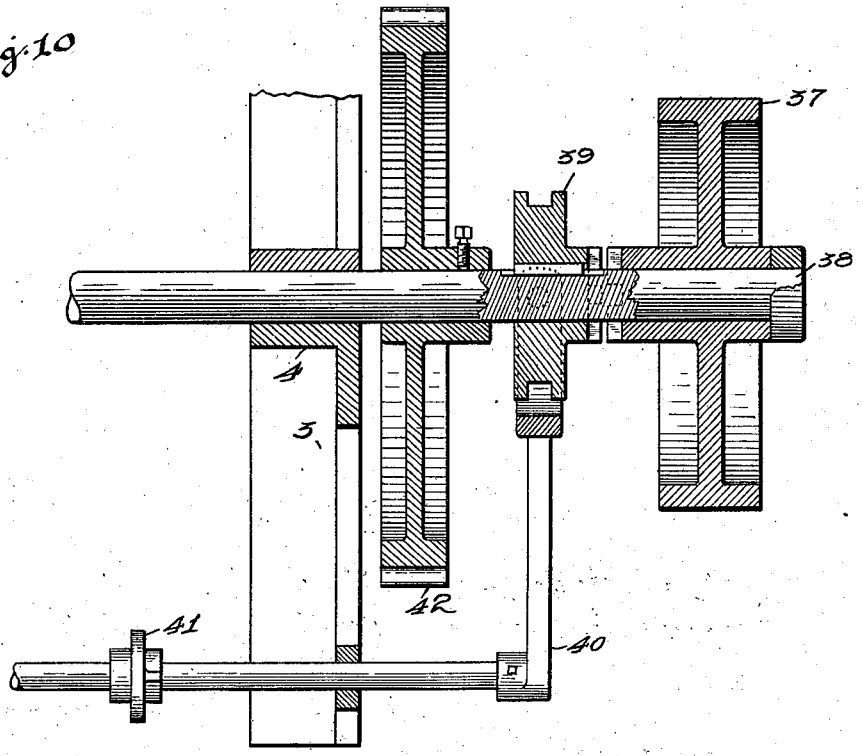

Figure 1 is a side view of a machine embodying my invention. Fig. 2 is a top view of the same. Fig. 3 is an enlarged perspective of the transverse bars and guide-heads used in my machine. Fig. 4 is a perspective of the upper adjustable frame of my machine. Fig. 5 is a longitudinal vertical section of the tilting bed of my machine. Fig. 6 is a detail of construction, showing the screw-and-worm attachment of the upper adjustable frame of my machine. Figs. 7 and 8 are perspective views of different forms of products of my machine. Fig. 9 is a front view of one of the transverse shafts and the adjustable saws carried by it. Fig. 10 is a longitudinal cross-section of the clutch and its attachments, whereby the feeding mechanism of my machine is thrown into or out of engagement. Fig. 11 is an enlarged view showing the work in position on the carrier and the relation of the saws to such work and carrier.

The operative mechanisms of my machine are attached to or mounted upon the frame 1, which consists of a machine-bed 2, supporting-legs 3, transverse braces 4, and a rectangular frame extending vertically from the bed 2 and formed by the uprights 5 and top cross-bar 6.

Power is communicated to the machine by means of the belt 7 and the pulley 8, which is mounted upon the shaft 9. At the outer extremity of the shaft 9 and at the end nearest which power is applied is mounted the pulley 10, which is connected by the belt 11 with the pulley 12, mounted on the shaft 13. The pulley 14 is also carried by the shaft 13 and is connected by the belt 15 to the pulley 16 on the shaft 17.

Circular saws 18 are adjustably mounted upon the shafts 9 and 17 by means of collars 19 and screws 20, as shown in Fig. 9. Guides 21 are provided with slots 22, extending through the upper and lower portions of their vertical sides. The guides 21 are mounted upon the cross-bars 23, as shown in Fig. 3, by means of a block 24, carried by the slot 25, and to which blocks 24 they are connected by means of the screw 26. Any number of these guides may be placed upon the cross-bars, their number depending upon the thickness and length of the strips which are to be sawed. The bars 23 are mounted upon the endless chains 27, which chains are carried by the sprockets 28 and 29. The depth of the bottom cuts in the strips operated upon is determined by the adjustment of the sprockets 28, which sprockets are carried by the adjustable blocks 31, which are adjustably mounted in the vertical slides 32 in the brackets 33, and their adjustment is regulated by the screw 34.

At the extremity of the shaft 9 the pulley 35 is mounted, which pulley is connected by the belt 36 with the pulley 37, mounted on the shaft 38, which shaft is provided with a clutch 39, actuated by the lever 40 and trip 41. The shaft 38 is also provided with a gear 42, which intermeshes with the gear 43, mounted on the shaft 44. The sprockets 29 are carried by the shaft 44 and are caused to actuate the endless chains 27 by the operation of the clutch 39.

By means of the adjustable mounting of the circular saws 18 and the adjustment of the endless chains 27 any desired number of cuts or slots at any desired interval and of any desired depth may be made in the lower edges of the strips of material operated upon.

The upright members 5 are provided with the frame 45, as shown in Fig. 4. This frame is vertically adjusted by means of the screws 46, mounted upon the transverse member 47, which screws are actuated by the gears 48 and the worms 49, mounted on the shaft 50, which shaft is actuated by the crank 51.

The shaft 17 is pivotally connected to the shaft 13 by means of the bars 52 and normally rests upon the lower transverse members 53 of the frame 45. At each side of the frame 45 the shaft 17 is suspended by means of links 54. At one extremity the link 54 is engaged at the end of the lever 55, which is rigidly mounted upon the shaft 56. At the opposite extremity of the shaft 56 the other link 54 is engaged with the arm 57, which is rigidly fastened to the end of the shaft 56.

The disengagement of the shaft 17 and the saws 18, carried thereby, is effected by moving the shaft 17 to the desired position by means of the lever 55 and then inserting a pin through that one of the holes 5$^a$ in the upright 5 which is next beneath the lever 55.

By means of the operation of the lever 55 the shaft 17 and the saws carried by it may be thrown into or out of engagement with the surfaces being sawed. As the material indicated and used under the patents of Schoenthaler, above referred to, is a thin strip or veneer, as shown in Figs. 7 and 8, which strips or veneer are very thin, light, and frangible, it is desirable and necessary that the machine whereby they are cut shall be provided with means for accurately cutting and holding them firmly at all points possible. To this end I have provided my adjustable frame 45 with a series of guide-racks 58, which are rectangular in form and adjustably mounted upon the transverse members of the adjustable frame 45. These transverse members are preferably formed, as shown in Fig. 4, of the angle-bars 59 and 60, the member 61, and the slotted member 62, containing the slot 63, arranged as shown. The guide-rack 58 is then provided with the adjusting-screw 64, by means of which the rack is loosened from or attached to the transverse slotted member 62, as may be desired. I also provide my sawing-machine with a tilting bed 65, as shown in Fig. 5, which is hinged at its rear extremity by means of the pivots 66 and adjustable at the front by means of the screws 67, mounted in the lugs 68.

The space between the lower saws is provided with the additional guides 69, which are laterally adjustable in the shoulders 70, formed in the tilting bed 65, by means of the screws 71, extending through the slots 72.

It will be seen that I have thus provided means for cutting the strips or veneer of the aforesaid patents to Schoenthaler with any desired depth and number of grooves, both at the top and bottom, and, further, that by means of the guides 21, mounted upon the endless chains 27, I have provided a cheap, effective, and practically automatic feeding mechanism whereby the strips or veneer may be fed to the machine and which feeding mechanism may be thrown into or out of operation as desired by means of the trip 41 and its connections.

The operation of my machine is as follows: The guides 21 are adjusted upon the cross-bars 23 in order to fix the distance between the cuts which are to be made in the upper and lower edges of the strips which are to be operated upon. The saws 18 are then adjusted so that as the material is fed toward them by the guides 21 the saws 18 upon the upper transverse shaft will cut through the slots 22 and the strips carried by the guides. The saws 18 upon the lower transverse shaft are adjusted to operate through the slots 22 and to make a corresponding cut in the lower edge of the material as it is fed to the saws 18 by the forward movement of the guides 21. The operation of the belt 7 revolves the pulley 8 and its connections, including the sprockets 28 and 29 and endless chains 27. The chains 27 carry with them the guides 21 and the strips which are being operated upon and which have been fed into position by the operator at the front of the machine above the sprocket 28. The strips are fed vertically and are carried toward and between the saws 18, so that the requisite cuts are formed in their upper and lower edges as are shown by the specimens of such figures, as shown in Figs. 7 and 8. The strips when cut are carried on toward the rear of the machine by the endless chains 27 and are discharged upon the floor or a receiving-table as the guides 21 are carried over the sprockets 29.

In Fig. 11 there is shown an enlarged view of the front portion of a machine embodying my invention, showing the relationship between the saws and the work and the carrier. I have indicated, by depicting the last position of the hand of the operator as the ascending guide 21$^a$ (which I mark 21$^a$ for the purpose of distinguishing it from the other members of the series of guides 21) is carried to a vertical position around the sprocket 28, the manner in which the work is caught and held by the guides 21. It will be perceived that the next movement of the operator after the position of his hand shown in Fig. 11 will be the withdrawal of the hand as the guide 21$^a$ assumes a vertical position and is brought into contact with the strips and exerts a lateral holding pressure upon them, such as is shown to be exerted upon them by the hand in the position shown in the said figure.

While in Fig. 2 I have only shown two of the guides 21 upon each of the cross-bars 23 and have shown a number of the circular saws 18, the particular number of the saws 18 and guides 21 there shown is immaterial, as in practice I intend that there shall be one of the guides 21 to correspond with each one of the circular saws 18.

The guide-rack 58 is of the form shown in perspective in Fig. 4, and its lower surface serves as a guide to prevent the strips of veneer which are being operated upon from being thrust upwardly and out of alinement with each other during the process of sawing.

Having thus described my invention, what I claim as new, and desire to have secured to me by the grant of Letters Patent, is—

1. In a machine of the class named, parallel opposing shafts in the same vertical plane provided with circular saws adjustably mounted, the upper shaft being pivotally mounted on an adjustable frame and provided with a lever, a feeding-belt provided with guides adapted to be laterally adjusted, said guides being provided with vertical slots at their upper and lower extremities by which the guides are enabled to pass between the circular saws mounted on the opposing shafts, and a tilting operating-bed, substantially as and for the purposes specified.

2. In a machine of the class named, a machine-frame provided with an operating-bed, a transverse shaft mounted in the operating-bed and provided with circular saws laterally adjustable, said machine-frame having a vertical extension provided with a sliding frame and a horizontal shaft carried by the adjustable frame and provided with circular saws adapted to be laterally adjusted, screws and worms whereby the vertical adjustment of the adjustable frame is effected, an adjustable table pivoted to the working bed of the frame, guides carried upon the endless chains and operating upon the surfaces of the adjustable bed, said guides being provided with vertical slots in their upper and lower extremities to permit their passage between the circular saws, and a clutch mechanism whereby the saws may be operated independent of the operation of the guides and endless chains, substantially as and for the purposes specified.

3. In a machine of the class named, the combination of a frame provided with a tilting operating-bed, and a vertical member carrying an independently-adjustable frame; a shaft provided with circular saws mounted in the main frame; a shaft provided with circular saws and resting on the side bars of the adjustable frame, a vertical screw actuated by gears and a transverse worm whereby the adjustable frame is adjusted; a transverse bar provided with a lever and suitable connections whereby the upper saw-shaft may be thrown out of engagement; guide-racks horizontally adjustable upon the adjustable frame; guide-bars carrying the guide-racks; and a clutch whereby the endless chains and the guides carried thereby may be thrown into engagement, substantially as and for the purposes specified.

4. In a machine of the class named, parallel opposing shafts in the same vertical plane, opposing circular saws mounted upon said shafts, a tilting operating-bed above and over which the work is to be carried, said operating-bed being located between the opposing saws and its tilting being adapted to regulate the depth to which the work is to be cut by the saws mounted upon the lower shaft, an endless chain operated upon and over the surface of the operating-bed to carry the work to and between the saws, and means whereby the upper shaft is adjustable to regulate the depth of the cuts to be made by the saws carried by it, substantially as and for the purposes specified.

5. In a machine of the class named, a main frame carrying a transverse shaft provided with circular saws and provided with a tilting operating-bed; an opposing shaft provided with circular saws mounted above the operating-bed and carried by a frame, means whereby the said frame may be adjusted vertically, means whereby the shaft above the operating-table may be thrown out of engagement, an endless chain carried by the main frame and adapted to convey the work over the top of the operating-table and between the saws, cross-bars mounted upon the endless chain, and guides carried by the cross-bars and horizontally adjustable thereon, substantially as and for the purposes specified.

In testimony whereof I affix my signature in presence of two witnesses.

WALTER GOETHE.

Witnesses:
  M. G. IRION,
  ALFRED A. EICKS.